United States Patent
Safai

(10) Patent No.: US 11,375,677 B2
(45) Date of Patent: Jul. 5, 2022

(54) FLUID CONSERVATION SYSTEM AND METHODS OF USE

(71) Applicant: Max Safai, San Juan Capistrano, CA (US)

(72) Inventor: Max Safai, San Juan Capistrano, CA (US)

(*) Notice: Subject to any disclaimer, the term of this patent is extended or adjusted under 35 U.S.C. 154(b) by 262 days.

(21) Appl. No.: 16/866,321

(22) Filed: May 4, 2020

(65) Prior Publication Data

US 2020/0396913 A1 Dec. 24, 2020

Related U.S. Application Data

(60) Provisional application No. 62/863,418, filed on Jun. 19, 2019.

(51) Int. Cl.
| | |
|---|---|
| *G05B 13/04* | (2006.01) |
| *A01G 25/16* | (2006.01) |
| *G06F 30/28* | (2020.01) |
| *G06F 17/18* | (2006.01) |
| *G06F 113/14* | (2020.01) |
| *G06F 113/08* | (2020.01) |

(52) U.S. Cl.
CPC .......... *A01G 25/16* (2013.01); *G05B 13/042* (2013.01); *G06F 17/18* (2013.01); *G06F 30/28* (2020.01); *G06F 2113/08* (2020.01); *G06F 2113/14* (2020.01)

(58) Field of Classification Search
CPC ......... A01G 25/16; G06F 30/28; G06F 17/18; G06F 2113/08; G06F 2113/14; G05B 13/042
See application file for complete search history.

(56) References Cited

U.S. PATENT DOCUMENTS

| | | | |
|---|---|---|---|
| 5,139,044 A * | 8/1992 | Otten | A01G 25/16 239/69 |
| 10,039,240 B2 | 8/2018 | Darnold | |
| 10,561,078 B2 | 2/2020 | Darnold | |
| 10,788,438 B2 | 9/2020 | Nemecek et al. | |
| 2012/0054125 A1* | 3/2012 | Clifton | G06Q 50/06 705/412 |
| 2016/0041565 A1* | 2/2016 | Edwards | G01M 3/00 700/282 |
| 2016/0335875 A1* | 11/2016 | Alcorn | G01F 1/34 |
| 2017/0159270 A1* | 6/2017 | Garg | H04N 21/478 |

(Continued)

*Primary Examiner* — Gary Collins
(74) *Attorney, Agent, or Firm* — Master Key IP, LLP; Justin G. Sanders

(57) ABSTRACT

A system and associated method are disclosed for dynamically and automatically optimizing fluid usage and preventing waste in an at least one pipe system, such as an irrigation system. In at least one embodiment, an at least one fluid sensor is positioned and configured for monitoring a flow of fluid through a pipe of an at least one zone of the pipe system. At least one control valve is positioned in-line with the pipe and configured for being selectively actuated for controlling the flow of fluid therethrough. At least one controller is positioned and configured for being in communication with each of the fluid sensor and control valve. At least one central computing system is in selective communication with the controller and configured for receiving and processing data related to at least one of the fluid sensor, controller and control valve.

20 Claims, 3 Drawing Sheets

(56) References Cited

U.S. PATENT DOCUMENTS

| | | | |
|---|---|---|---|
| 2017/0205781 A1* | 7/2017 | Brooks | G06Q 50/06 |
| 2018/0181111 A1* | 6/2018 | Cussonneau | G05B 17/02 |
| 2018/0216742 A1* | 8/2018 | Korten | G01L 7/08 |
| 2019/0195722 A1* | 6/2019 | Liu | G01M 3/2815 |
| 2020/0011722 A1* | 1/2020 | Rømer | G01D 4/004 |

* cited by examiner ental patent application relates generally to fluid conservation, and more particularly to a fluid conservation system and associated methods of use for dynamically and automatically optimizing fluid usage and preventing waste in a pipe system, such as an irrigation system.

FLUID CONSERVATION SYSTEM AND METHODS OF USE

This application claims priority and is entitled to the filing date of U.S. provisional application Ser. No. 62/863,418, filed on Jun. 19, 2019. The contents of the aforementioned application are incorporated herein by reference.

BACKGROUND

The subject of this provisional patent application relates generally to fluid conservation, and more particularly to a fluid conservation system and associated methods of use for dynamically and automatically optimizing fluid usage and preventing waste in a pipe system, such as an irrigation system.

Applicant(s) hereby incorporate herein by reference any and all patents and published patent applications cited or referred to in this application.

By way of background, water is becoming a scarce resource worldwide, which has had a significant impact on food production. According to research, agriculture accounts for roughly 70 percent of global water withdrawals. Some areas of the United States use up to 90 percent of available water for agricultural purposes. As water resources become less dependable or available in many areas, the prevention of water loss is an important topic for the agricultural industry—especially since water prices have continued to rise for growers. In response to this increasing problem, attempts have been made to form more effective methods of water and irrigation management in the agricultural industry. However, even with efficient irrigation systems in place, growers currently have no easy way of knowing when a leak might exist somewhere in their vast fields (especially when those fields are located in a remote area having little to no access to utilities such as gas and electricity), and too often discover a leak—which typically must be visually identified by a grower and then manually fixed—only after a significant amount of time has passed, resulting in wasted water and greater expense. Fluid conservation is important in other industries as well, such as oil for example.

Thus, there remains a need for a fluid conservation system and associated methods for dynamically and automatically optimizing fluid usage and preventing waste in a pipe system, such as an irrigation system, in near real-time, even where those pipe systems are remotely located. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a fluid conservation system and associated methods of use for dynamically and automatically optimizing fluid usage and preventing waste in a pipe system, such as an irrigation system for example. In at least one embodiment, an at least one fluid sensor is positioned and configured for monitoring a flow of fluid through a pipe of an at least one zone of the pipe system. An at least one control valve is positioned in-line with the pipe of at least one zone of the pipe system, the at least one control valve configured for being selectively actuated for controlling the flow of fluid through the associated pipe. An at least one controller is positioned and configured for being in communication with each of the at least one fluid sensor and at least one control valve so as to receive data collected by the at least one fluid sensor and selectively actuate the at least one control valve. An at least one central computing system is in selective communication with the at least one controller and configured for receiving and processing data related to at least one of the at least one fluid sensor, controller and control valve.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
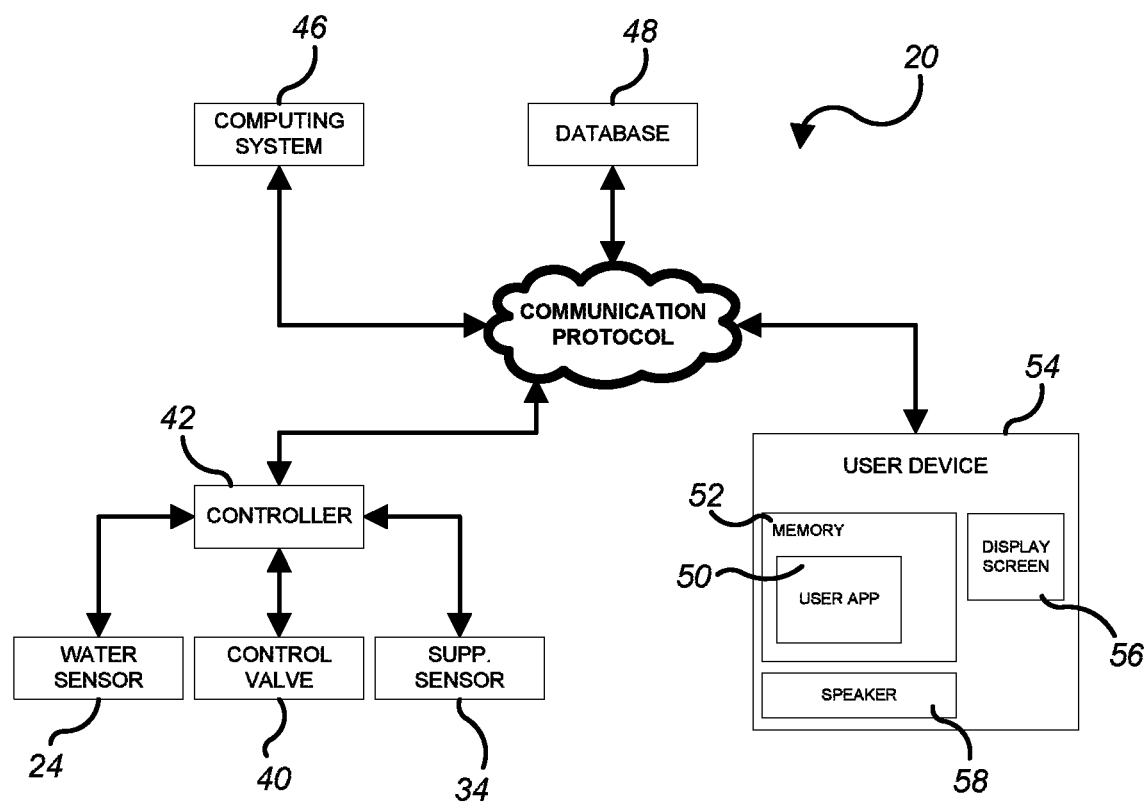
FIG. 1 is a simplified schematic view of an exemplary fluid conservation system, in accordance with at least one embodiment.

Turning now to FIG. 1, there is shown a simplified schematic view of an exemplary fluid conservation system 20 configured for dynamically and automatically optimizing fluid usage and preventing waste in an at least one pipe system 22, such as an irrigation system (FIG. 2), in accordance with at least one embodiment and as discussed further below. In that regard, it should be noted that while the system 20 is discussed in the context of an irrigation system for illustrative purposes herein, the system 20 should not be interpreted as being so limited. Instead, the system 20 may be utilized in virtually any pipe system 22 where there is a desire to optimize fluid usage and prevent waste. The conservation system 20 provides, in at least one embodiment, an at least one fluid sensor 24 positioned and configured for monitoring the fluid flowing through a pipe 26 of an at least one zone 28 of the pipe system 22. In at least one embodiment, the at least one fluid sensor 24 is at least one of a fluid flow sensor 30 and a fluid pressure sensor 32. In still further embodiments, the at least one fluid sensor 24 may be any other type of sensor, now known or later developed, capable of allowing the conservation system 20 to carry out the functionality herein described. For example, in at least one such further embodiment, the at least one fluid sensor 24 is a chemical analysis sensor capable of analyzing the fluid for characteristics such as salinity, suspended solids, and dissolved mineral content. In at least one embodiment, the at least one fluid sensor 24 is positioned in-line with the pipe 26 of at least one zone 28 of the pipe system 22—either in serial fluid communication or parallel fluid communication with the pipe 26. In at least one alternate embodiment, the at least one fluid sensor 24 is configured for being positioned on an exterior surface of the pipe 26. In at least one embodiment, as discussed further below, the conservation system 20 also provides an at least one supplemental sensor 34 positioned and configured for gathering additional data related to the pipe system 22, as discussed further below. In at least one such embodiment, the at least one supplemental sensor 34 is at least one of a fluid level sensor, a luminosity sensor, a humidity sensor, an air temperature sensor, a fluid temperature sensor, a rain sensor, and a soil moisture sensor. In at least one further embodiment, where the pipe system 22 includes an at least one fluid pump, the at least one supplemental sensor 34 includes an electrical current sensor and/or voltage sensor positioned and configured for monitoring the electrical usage of the pump. In at least one still further embodiment, the at least one supplemental sensor 34 is a meter reading device 36 positioned and configured for capturing images of a display of an existing meter 38 (such as a fluid meter display, for example), and converting the captured display images into numerical data (using image-to-text conversion methods) for subsequent processing by the conservation system 20. In still further embodiments, the at least one supplemental sensor 34 may be any other type of sensor, now known or later developed, capable of allowing the conservation system 20 to carry out the functionality herein described.

Figure 2:
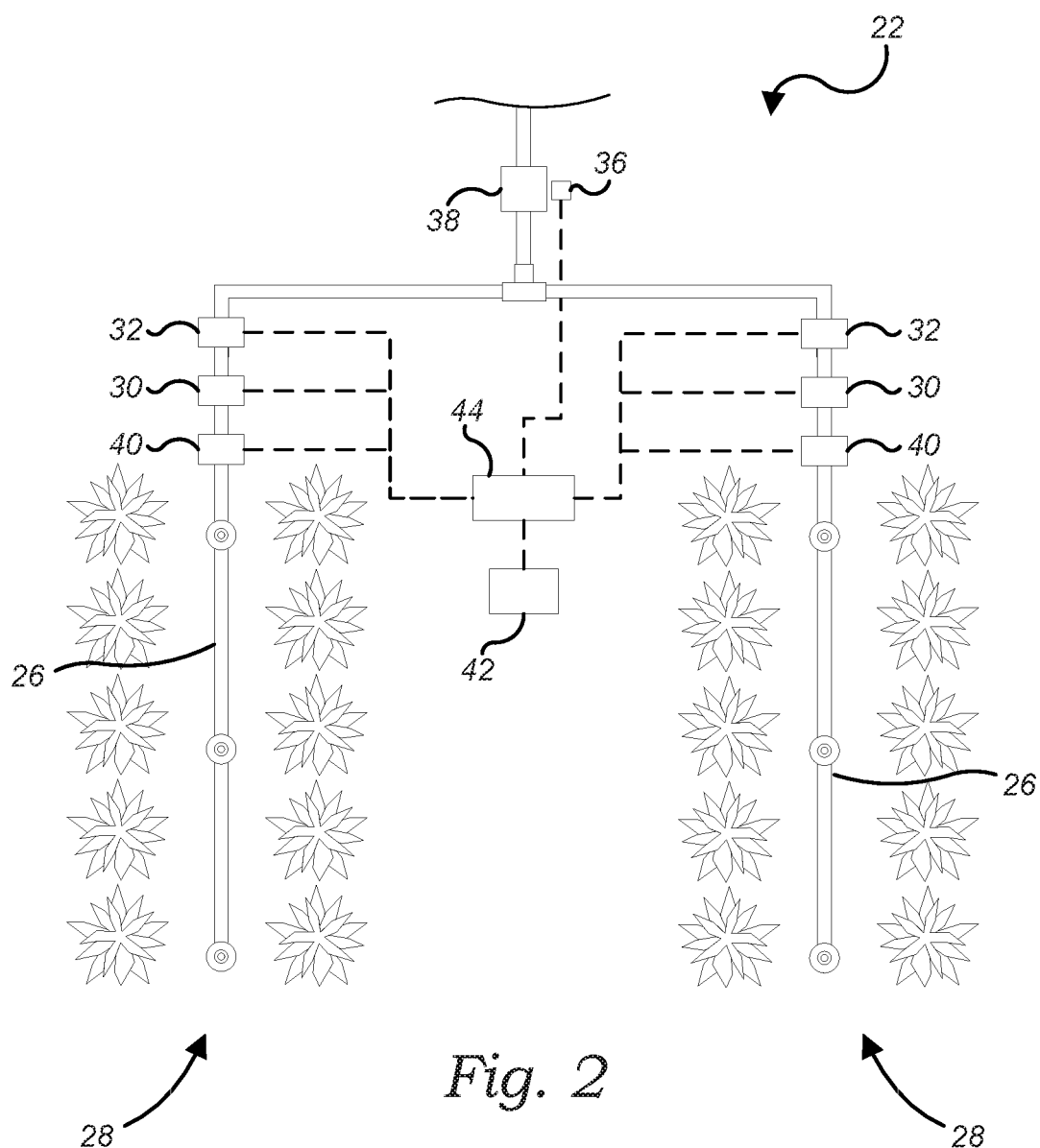
FIG. 2 is a diagram view thereof, in accordance with at least one embodiment.

With continued reference to FIGS. 1 and 2, in at least one embodiment, the conservation system 20 also provides an at least one control valve 40 positioned in-line with the pipe 26 of at least one zone 28 of the pipe system 22. The at least one control valve 40 is configured for being selectively actuated for controlling the flow of fluid through the associated pipe 26 as discussed further below.

In at least one embodiment, the conservation system 20 also provides an at least one controller 42 positioned and configured for being in communication with each of the at least one fluid sensor 24 and control valve 40. Accordingly, the at least one controller 42 is configured for receiving data collected by the at least one fluid sensor 24 (along with the at least one supplemental sensor 34, in at least one embodiment), and also selectively actuating the at least one control valve 40, as discussed further below. In at least one embodiment, the at least one controller 42 and control valve 40 are manufactured as a single unit. In at least one alternate embodiment, the at least one control valve 40 is remote from the controller 42, thereby enabling the at least one controller 42 (in at least one embodiment) to selectively actuate more than one control valve 40. In at least one embodiment, the at least one controller 42 provides at least one of a display screen, at least one indicator light, at least one button or keypad, and a speaker (or buzzer). Additionally, in at least one embodiment, the at least one controller 42 is in selective communication with an at least one printer.

In at least one embodiment, the conservation system 20 also provides an at least one power supply 44 in electrical communication with at least one of the at least one fluid sensor 24, supplemental sensor 34, control valve 40, and controller 42. In at least one embodiment, the at least one power supply 44 utilizes an at least one rechargeable battery. In at least one embodiment, the at least one power supply 44 is configured for utilizing solar power (such as via solar panels, for example), fluid power (such as via a fluid flow generator positioned within the pipe 26, for example), and/or wind power (such via a wind turbine, for example). In further embodiments, the at least one power supply 44 may utilize any other form of energy (alone or in combination), now known or later developed. In this way, the conservation system 20 is capable of operating in connection with remotely located pipe systems 22, even where such pipe systems 22 are off the grid.

With continued reference to FIG. 1, in at least one embodiment, the conservation system 20 also provides an at least one central computing system 46 in selective communication with the at least one controller 42 and configured for receiving and processing data related to at least one of the at least one fluid sensor 24, supplemental sensor 34, controller 42, and control valve 40, as discussed further below. Additionally, in at least one embodiment, an at least one database 48 is in communication with the computing system 46 and configured for selectively storing said data related to at least one of the at least one fluid sensor 24, supplemental sensor 34, controller 42, and control valve 40. In at least one embodiment, the computing system 46 and database 48 are one and the same—as such, it is intended that those terms as used herein are to be interchangeable with one another.

In at least one embodiment, the conservation system 20 also provides a user application 50 residing in memory 52 on an at least one user device 54 in the possession (or at least under the control) of an at least one user of the conservation system 20—such as a grower or other individual responsible for monitoring fluid usage for the associated at least one pipe system 22, including personnel associated with one or more utility companies. It should also be noted that the term "memory" is intended to include any type of electronic storage medium (or combination of storage mediums) now known or later developed, such as local hard drives, RAM, flash memory, secure digital ("SD") cards, external storage devices, network or cloud storage devices, integrated circuits, etc. In at least one embodiment, the user application 50 is in selective communication with at least one of the computing system 46 and the at least one controller 42, and is configured for receiving and processing data related to at least one of the at least one fluid sensor 24, supplemental sensor 34, controller 42, and control valve 40, as discussed further below. In at least one embodiment, the computing system 46 and database 48 are omitted, such that the conservation system 20 and associated methods described herein are implemented solely through the user application 50 on the user device 54—thus, any methods or functionality described herein as being carried out by the computing system 46, database 48, or the at least one controller 42 may, in at least one embodiment, also be carried out by the user application 50, regardless of whether such embodiments nevertheless incorporate the computing system 46 and/or database 48. In other words, the steps of the methods described herein should not be read as being limited to only being carried out by the particular components of the conservation system 46 expressly recited, but instead may be carried out by any other components (or combination of components) of the conservation system 20 in further embodiments.

It should also be noted that communication between each of the at least one fluid sensor 24, at least one supplemental sensor 34, at least one control valve 40, at least one controller 42, at least one computing system 46, at least one database 48, and at least one user device 54 may be achieved using any wired- or wireless-based communication protocol (or combination of protocols) now known or later developed. As such, the present invention should not be read as being limited to any one particular type of communication protocol, even though certain exemplary protocols may be mentioned herein for illustrative purposes. It should also be noted that the term "user device" is intended to include any type of computing or electronic device now known or later developed, such as desktop computers, mobile phones, smartphones, laptop computers, tablet computers, personal data assistants, gaming devices, wearable devices, etc. As such, the present invention should not be read as being limited to use with any one particular type of computing or electronic device, even though certain exemplary devices may be mentioned or shown herein for illustrative purposes.

With continued reference to FIG. 1, in the exemplary embodiment, each of the at least one computing system 46, at least one controller 42, at least one user device 54, and at least one database 48 contains the hardware and software necessary to carry out the exemplary methods for dynamically and automatically optimizing fluid usage and preventing waste in the at least one pipe system 22, as described herein. Furthermore, in at least one embodiment, the computing system 46 comprises a plurality of computing devices selectively working in concert with one another to carry out the exemplary methods for dynamically and automatically optimizing fluid usage and preventing waste in the at least one pipe system 22, as described herein. Furthermore, the various components of the at least one user device 54 may reside on a single computing and/or electronic device, or may separately reside on two or more computing and/or electronic devices in communication with one another. In at least one alternate embodiment, the functionality provided by the user application 50 resides remotely in memory on the computing system 46 and/or database 48, with each user device 54 capable of accessing said functionality via one or more online portals hosted by the computing system 46 and/or database 48, either in addition to or in lieu of the user application 50 residing locally in memory 52 on the at least one user device 54. It should also be noted that, for simplicity purposes, when discussing functionality and the various methods that may be carried out by the conservation system 20 herein, the terms "user device" and "user application" are intended to be interchangeable.

With continued reference to FIG. 1, in at least one embodiment, the at least one user device 54 provides an at least one display screen 56 for providing an at least one graphical user interface to assist the associated user to utilize the various functions provided by the conservation system 20. Furthermore, in at least one embodiment, as discussed further below, the at least one user device 54 provides an at least one speaker 58. Additionally, in at least one embodiment, the at least one user device 54 provides an at least one input device, such as a touchscreen, a keyboard, a mouse, etc.

As discussed in detail below, the conservation system 20 may be utilized in a variety of contexts. In each such context, the at least one controller 42 (or alternatively, the computing system 46) continuously monitors the associated pipe 26 of an at least one zone 28 of the at least one pipe system 22—through analyzing the data it gathers from the associated at least one fluid sensor 24 and supplemental sensor 34 (in at least one embodiment)—and upon detecting a possible leak in the pipe 26 (or, alternatively, a surplus of fluid in the zone 28), automatically shuts off the flow of fluid via the associated control valve 40 and notifies the user application 50 of the associated at least one user device 54. It should be noted that the below described applications of the conservation system 20 are merely exemplary and are being provided herein for illustrative purposes. As such, the conservation system 20 and associated methods described herein should not be read as being so limited, but instead can be utilized in any context, now known or later conceived, where there is a need for optimizing fluid usage and preventing waste in an pipe system—not just in agricultural irrigation contexts.

Figure 3:
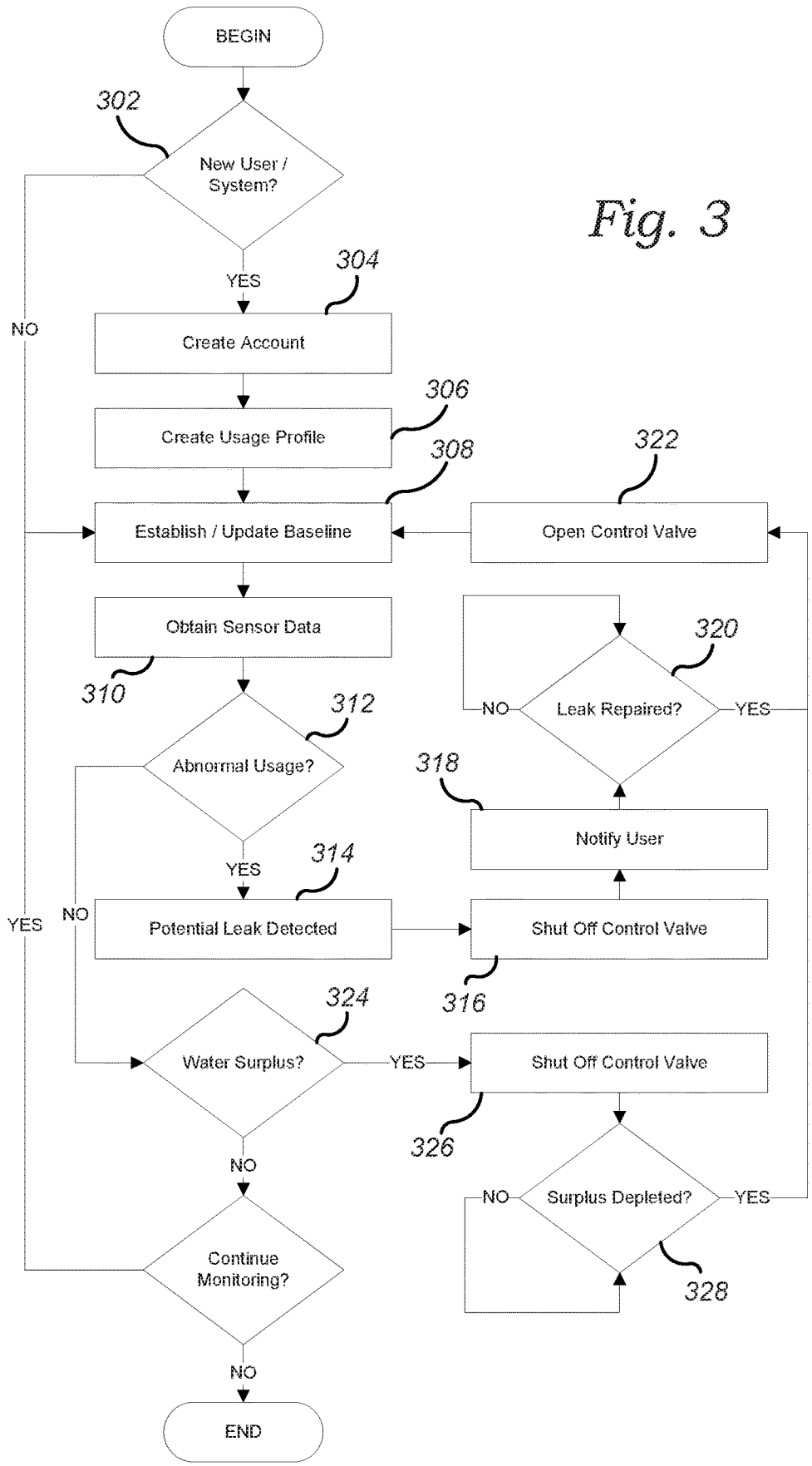
FIG. 3 is a flow diagram of an exemplary method for detecting and automatically responding to a leak in an exemplary agricultural irrigation system, in accordance with at least one embodiment.

In at least one embodiment, as illustrated in the flow diagram of FIG. 3, through the user application 50 and/or the computing system 46, upon an associated user accessing the conservation system 20, the computing system 46 first determines whether the user (or the pipe system 22) is new to the conservation system 20 (302). If the user and/or pipe system 22 is new, the user is required to properly register a new account with the computing system 22 via the user application 50 (304)—or, alternatively, via any other computing or electronic device capable of communicating with the computing system 46. The user is also required to create a usage profile for the pipe system 22 (306). In at least one embodiment, a separate usage profile is created for each distinct zone 28 of the pipe system 22, to better assist the conservation system 20 in determining potential leaks. In at least one embodiment, each usage profile contains data associated with at least one of a unique zone identifier, a zone location (i.e., the geographic location of the associated zone 28, allowing the conservation system 20 to determine certain environmental conditions such as current temperature, humidity and weather for example), a zone elevation, a crop type, a soil type, a watering schedule, an average gallons per watering cycle, an average fluid flow rate, an average fluid pressure rate, and an at least one contact phone number or email address for directing appropriate notifications to the associated at least one user. In at least one embodiment, rather than requiring the user to input this data, the conservation system 20 may optionally obtain some or all of this data automatically via the at least one controller 42 and associated at least one fluid sensor 24 and supplemental sensor 34. Once the usage profile has been created, a baseline is established either manually by the user or automatically by the conservation system 20 (308). In at least one embodiment, the baseline may be updated periodically by the conservation system 20 or upon request by the user. Additionally, in at least one embodiment, multiple usage profiles and associated baselines may be created for a given zone 28 of the pipe system 22 in order to accommodate changes in crops, or seasons/weather, or to allow the user to experiment toward refinement. Thus, in at least one embodiment, the conservation system 20 is capable of learning and adapting to the characteristics of a particular irrigation requirement that corresponds to what the user is growing in order to optimize fluid usage and reduce fluid waste.

After the baseline has been established, the computing system 46 continues to monitor fluid usage by the pipe system 22 based on the data it receives from the at least one controller 42 (310). In at least one embodiment, the computing system 46 utilizes a unique intelligent algorithm that uses statistical processing and machine learning to analyze fluid usage characteristics of the pipe system 22 as compared to the previously established baseline. Upon determining that the fluid usage data has exceeded a pre-defined usage threshold as compared to the baseline (312)—i.e., if abnormal fluid usage is detected—the computing system 46 concludes that the existence of a leak in the pipe system 22 is likely (314).

In at least one embodiment, the computing system 46 models measurements of fluid pressure and/or flow rate as a discrete time Gaussian auto-regression. In at least one such embodiment, the fluid pressure in a given pipe 26 is modeled by the computing system 46 as a time series driven by the following discrete time Markov chain:

$$X_{n+1} = \rho X_n + b + \varepsilon_n$$

where $\varepsilon_n$ are independent and identically distributed mean zero Gaussian random variables with variance $\sigma^2$, $X_n$ represents the value of fluid pressure at time n, $\rho$ represents a correlation coefficient (positive and large $\rho$ means that large pressure measurements at time n will likely entail large pressure measurement at time n+1), b represents a scaled baseline expected pressure value (in the sense that at equilibrium the expected pressure value $X_n$ has expected value $$EX_n = \frac{b}{1-\rho}\Big),$$

and $\varepsilon_n$ represents the measurement noise at time n. The parameters $\rho$, b, and $\sigma^2$ are estimated from data using the principle of maximum likelihood. In other words, in at least one such embodiment, to fit the data, the computing system 46 makes m measurements $X_0 = x_0$, $X_1 = x_1$, ..., $X_m = x_m$ and observes that, under the model, the likelihood of observing those measurements is given by the following formula:

$$P_{\rho,b,\sigma^2}(x_m, x_{m-1}, \ldots, x_2, x_1) =$$
$$P(x_1) P_{\rho,b,\sigma^2}(x_2 \mid x_1) P_{\rho,b,\sigma^2}(x_3 \mid x_2) \ldots P_{\rho,b,\sigma^2}(x_m \mid x_{m-1}) =$$
$$P(x_1) \left( \frac{e^{-\frac{(x_1 - \rho x_0 + b)^2}{\sigma^2}}}{\sqrt{2\pi\sigma^2}} \right) \ldots \left( \frac{e^{-\frac{(x_m - \rho x_{m-1} + b)^2}{\sigma^2}}}{\sqrt{2\pi\sigma^2}} \right).$$

In at least one such embodiment, the maximum likelihood estimators $\varepsilon_\rho$, $\varepsilon_b$, and $\varepsilon_{\sigma^2}$ are the choices of $\rho$, b, and $\sigma^2$ that maximize the likelihood above. It is known that the above optimization problem can be easily solved by taking logarithms and switching to canonical variables, resulting in a convex optimization problem. In at least one such embodiment, once the data is modeled by the computing system 46 as discussed above, and conditional on having measured $X_n = x_n$, the computing system 46 observes that $X_{n+1}$ is a Gaussian random variable with mean $\varepsilon[X_{n+1} \mid X_n = x_n] = \rho x_n + b$ and variance $\sigma^2$. Therefore the computing system 46 can calculate a 1-$\varepsilon$ (e.g. 99.5%) confidence interval around its mean. For example, the interval $[\rho x_n + b - 2.8\sigma, \rho x_n + b + 2.8\sigma]$ corresponds to a 99.5% confidence interval (i.e., a z-score of 2.8). Accordingly, in such an embodiment, the computing system 46 determines the existence of a leak upon determining that the next measurement $X_{n+1} = x_{n+1}$ is not in the calculated interval.

In at least one embodiment, where the pipe system 22 incorporates a different controller 42 for each distinct zone 28 in the pipe system 22 (thereby enabling the computing system 46 to separately monitor and analyze the fluid usage of each zone 28), the computing system 46 is capable of identifying which zone 28 is suffering from the potential leak. The computing system 46 then automatically instructs the associated controller 42 to actuate the appropriate control valve 40 in order to shut the fluid off in the affected zone 28 of the pipe system 22 (316) until the leak has been fixed. In at least one further embodiment, where the pipe system 22 includes an at least one fluid pump, the computing system 46 also automatically shuts off the at least one fluid pump. Additionally, the computing system 46 sends a notification to the at least one contact phone number or email address associated with the corresponding usage profile (318), so that the user may proceed with having the leak repaired in due course. In at least one embodiment, the user application 50 provides a map via the user interface, with the affected zone 28 clearly marked on the map (based on the GPS coordinates of the associated controller 42, in at least one embodiment) to assist the user in locating the affected zone. In at least one further embodiment, the associated at least one controller 42 provides at least one of an audible or visual leak indicator (such as a light or a siren for example) that may be selectively activated by the computing system 46, so as to better assist the user in locating the affected zone 28. In at least one embodiment, upon the leak being repaired (320), the user notifies the computing system 46, the control valve 40 is re-opened (322), and automatic monitoring of that zone 28 (or pipe system 22) by the conservation system 20 resumes.

In at least one embodiment, where the conservation system 20 includes an electrical current sensor and/or voltage sensor positioned and configured for monitoring the electrical usage of a pump of the pipe system 22, the computing system 46 is configured for monitoring a current draw of the pump, which could rise during abnormal conditions. In the event debris builds up in a filter of the pump, or other conditions occur which cause the pump to work harder (thereby drawing a greater amount of electrical current), or otherwise not work at all (thereby drawing no electrical current), the computing system 46 is able to detect such abnormal conditions and send a notification to the at least one contact phone number or email address associated with the corresponding usage profile, so that the user may proceed with having the pump repaired or cleaned.

In at least one further embodiment, the conservation system 20 includes an at least one fluid pressure sensor 32 positioned and configured for using differential pressure sensing before and after the filter of the pump. Thus, in such an embodiment, as the filter gets dirty, the flow through the filter becomes restricted and pressure before the filter will be relatively greater than pressure after the filter. As the filter gets more clogged, a threshold will trigger the computing system 46 to send a notification to the at least one contact phone number or email address associated with the corresponding usage profile, so that the user may check and clean the filter.

Additionally, in at least one embodiment, the computing system 46 is capable of determining when irrigation is not needed, due to rainfall or soil moisture for example. Thus, in at least one such embodiment, use of supplemental sensors 34 such as humidity sensors, rain sensors, air temperature sensors, fluid temperature sensors, and moisture sensors (including soil moisture sensors) can allow the computing system 46 to make such fluid surplus determinations, which can be used to dynamically modify irrigation. For example, in at least one such embodiment, the computing system 46 utilizes the data gathered by such supplemental sensors 34 to calculate Penman-Monteith Evapotranspiration rates for optimal irrigation delivery. Similar to a leak detection, upon the computing system 46 determining that no additional fluid is necessary for a particular zone 28 of the pipe system 22 (324), the computing system 46 automatically instructs the associated controller 42 to actuate the appropriate control valve 40 in order to shut the fluid off in the zone 28 of the pipe system 22 (326) until the surplus of fluid has been depleted (328), at which point the control valve 40 is re-opened (322) by the controller 42 so that the normal watering schedule in that zone 28 may resume. In at least one such embodiment, the computing system 46 sends a notification to the at least one contact phone number or email address associated with the corresponding usage profile, so that the user is made aware of the temporary change in the normal watering schedule. In at least one embodiment, the computing system 46 also updates the usage profile and associated baseline for the zone 28 (308), to account for the temporary surplus of fluid.

As mentioned above, in at least one embodiment, the at least one fluid sensor 24 includes a chemical analysis sensor capable of analyzing the fluid for characteristics such as salinity, suspended solids, and dissolved mineral content. In at least one such embodiment, the chemical analysis sensor comprises a fluid temperature sensor, a conductivity sensor, and a turbidity sensor, with said sensors being capable of gathering data for allowing the computing system 46 to analyze the fluid for characteristics such as salinity, suspended solids, and dissolved mineral content to assess abnormal levels of mineralization, harmful salinity levels, excess sediment, and potential presence of bacteria and algae. Additionally, in at least one such embodiment, the computing system 46 is capable of utilizing data gathered by the fluid temperature sensor to determine and provide freeze warnings and potentially modify control valve 40 behavior, such as opening a given control valve 40 just above freeze temperatures to alleviate pressure in the associated pipe 26 and prevent bursting until the freeze warning can be responded to. Additionally, it at least one such embodiment, the computing system 46 is capable of utilizing data gathered by the air temperature sensor (in conjunction with data gathered by other sensors, such as humidity, luminosity, weather data, etc.) as an input to evapotranspiration modeling as well as to determine and report anomalous extreme temperatures (i.e., freeze danger, high ambient temperature for crop danger, catastrophic events such as wildfires, etc.). In at least one still further embodiment, the computing system 46 is capable of utilizing solar output efficiency to calculate luminosity.

In at least one embodiment, the user is able to access and generate desired reports on all fluid usage data associated with the pipe system 22 via the user application 50 or otherwise via the computing system 46. Additionally, in at least one embodiment, the data that is collected and processed by the computing system 46 may be correlated to GPS coordinates and superimposed on a map in order to provide local utility companies with valuable information about fluid delivery characteristics in their system, which could provide them with an early warning of possible fluid distribution issues.

Aspects of the present specification may also be described as the following embodiments:

1. A method for dynamically and automatically optimizing fluid usage and preventing waste in an at least one pipe system, the method comprising the steps of: positioning an at least one fluid sensor for monitoring at least one of a fluid pressure and a fluid flow rate within a pipe of an at least one zone of the pipe system; positioning an at least one control valve in-line with the pipe of at least one zone of the pipe system, the at least one control valve configured for being selectively actuated for controlling a flow of fluid through the associated pipe; positioning an at least one controller for being in communication with each of the at least one fluid sensor and at least one control valve so as to receive data collected by the at least one fluid sensor and selectively actuate the at least one control valve; implementing an at least one central computing system in selective communication with the at least one controller and configured for receiving and processing data related to at least one of the at least one fluid sensor, controller and control valve; the at least one computing system storing an at least one usage profile for the at least one pipe system, each said usage profile containing at least one of a unique zone identifier, a zone location, a zone elevation, a crop type, a soil type, a watering schedule, an average gallons per watering cycle, an average fluid flow rate, and an average fluid pressure rate; the at least one computing system establishing an at least one baseline for the at least one usage profile; the at least one fluid sensor periodically measuring at least one of the fluid pressure and fluid flow rate within the associated pipe and transmitting said measurements to the at least one controller; the at least one controller transmitting said measurements to the at least one computing system; the at least one computing system modeling at least one of the fluid pressure and fluid flow rate within the associated pipe as a time series driven by the following discrete time Markov chain:

$$X_{n+1} = \rho X_n + b + \varepsilon_n$$

where $X_n$ represents the value of fluid pressure or fluid flow rate at time n, $\rho$ represents a correlation coefficient, b represents a scaled baseline expected pressure or flow rate value, and $\varepsilon_n$ represents the measurement noise at time n; the at least one computing system calculating the parameters $\rho$, b, and variance $\sigma^2$ using the following formula:

$$P_{\rho,b,\sigma^2}(x_m, x_{m-1}, \ldots, x_2, x_1) =$$
$$P(x_1) P_{\rho,b,\sigma^2}(x_2 \mid x_1) P_{\rho,b,\sigma^2}(x_3 \mid x_2) \ldots P_{\rho,b,\sigma^2}(x_m \mid x_{m-1}) =$$
$$P(x_1) \left( \frac{e^{-\frac{(x_1 - \rho x_0 + b)^2}{\sigma^2}}}{\sqrt{2\pi\sigma^2}} \right) \ldots \left( \frac{e^{-\frac{(X_m - \rho X_{m-1} + b)^2}{\sigma^2}}}{\sqrt{2\pi\sigma^2}} \right)$$

where $X_0 = x_0$, $X_1 = x_1$, . . . , $X_m = x_m$; the at least one computing system calculating a $1-\varepsilon$ confidence interval around a mean $\varepsilon[X_{n+1} \mid X_n = x_n] = \rho x_n + b$ and variance $\sigma^2$; and upon the at least one computing system determining that a next measurement $X_{n+1} = x_{n+1}$ is not in the calculated interval: the computing system concluding that a leak likely exists in the associated pipe; and the computing system transmitting instructions to the associated at least one controller to cause the associated at least one control valve to shut off the flow of fluid to the associated pipe.

2. The method according to embodiment 1, wherein the step of positioning the at least one fluid sensor further comprises the step of positioning the at least one fluid sensor in-line with the pipe so as to be in fluid communication with the pipe.

3. The method according to embodiments 1-2, wherein the step of positioning the at least one fluid sensor further comprises the step of positioning the at least one fluid sensor on an exterior surface of the pipe.

4. The method according to embodiments 1-3, further comprising the step of positioning an at least one supplemental sensor for gathering additional data related to the pipe system.

5. The method according to embodiments 1-4, wherein the step of positioning the at least one supplemental sensor further comprises the step of positioning at least one of a fluid level sensor, a luminosity sensor, a humidity sensor, an air temperature sensor, a fluid temperature sensor, a rain sensor, and a soil moisture sensor.

6. The method according to embodiments 1-5, wherein the step of positioning the at least one supplemental sensor further comprises the step of positioning at least one of an electrical current sensor and a voltage sensor for monitoring the electrical usage of an at least one fluid pump of the pipe system.

7. The method according to embodiments 1-6, wherein the step of the computing system transmitting instructions to the associated at least one controller to shut off the flow of fluid to the associated pipe further comprises the step of the computing system shutting off the associated at least one fluid pump.

8. The method according to embodiments 1-7, wherein the step of positioning the at least one supplemental sensor further comprises the step of positioning a meter reading device for capturing images of a display of an existing meter and converting the captured display images into numerical data for subsequent processing by the fluid conservation system.

9. The method according to embodiments 1-8, further comprising the step of the at least one supplemental sensor gathering additional data related to the pipe system and transmitting said additional data to the at least one controller.

10. The method according to embodiments 1-9, further comprising the step of implementing a user application residing in memory on an at least one user device in communication with the at least one computing system, the at least one user device under the control of an at least one user.

11. The method according to embodiments 1-10, wherein the step of the at least one computing system determining that a next measurement $X_{n+1}=x_{n+1}$ is not in the calculated interval, further comprises the step of the computing system transmitting an alert notification to the associated user application.

12. The method according to embodiments 1-11, wherein the step of the at least one computing system determining that a next measurement $X_{n+1}=x_{n+1}$ is not in the calculated interval, further comprises the step of the computing system transmitting at least one of an audible leak indicator and a visual leak indicator to be produced by the associated at least one controller.

13. A fluid conservation system configured for dynamically and automatically optimizing fluid usage and preventing waste in an at least one pipe system, the system comprising: an at least one fluid sensor positioned and configured for monitoring a flow of fluid through a pipe of an at least one zone of the pipe system; an at least one control valve positioned in-line with the pipe of at least one zone of the pipe system, the at least one control valve configured for being selectively actuated for controlling the flow of fluid through the associated pipe; an at least one controller positioned and configured for being in communication with each of the at least one fluid sensor and at least one control valve so as to receive data collected by the at least one fluid sensor and selectively actuate the at least one control valve; an at least one central computing system in selective communication with the at least one controller and configured for receiving and processing data related to at least one of the at least one fluid sensor, controller and control valve; wherein, the system is configured for carrying out the steps of: the at least one computing system storing an at least one usage profile for the at least one pipe system, each said usage profile containing at least one of a unique zone identifier, a zone location, a zone elevation, a crop type, a soil type, a watering schedule, an average gallons per watering cycle, an average fluid flow rate, and an average fluid pressure rate; the at least one computing system establishing an at least one baseline for the at least one usage profile; the at least one fluid sensor periodically measuring at least one of the fluid pressure and fluid flow rate within the associated pipe and transmitting said measurements to the at least one controller; the at least one controller transmitting said measurements to the at least one computing system; the at least one computing system modeling at least one of the fluid pressure and fluid flow rate within the associated pipe as a time series driven by the following discrete time Markov chain:

$$X_{n+1} = \rho X_n + b + \varepsilon_n$$

where $X_n$ represents the value of fluid pressure or fluid flow rate at time n, $\rho$ represents a correlation coefficient, b represents a scaled baseline expected pressure or flow rate value, and $\varepsilon_n$ represents the measurement noise at time n; the at least one computing system calculating the parameters $\rho$, b, and variance $\sigma^2$ using the following formula:

$$P_{\rho,b,\sigma^2}(x_m, x_{m-1}, \ldots, x_2, x_1) =$$
$$P(x_1) P_{\rho,b,\sigma^2}(x_2 \mid x_1) P_{\rho,b,\sigma^2}(x_3 \mid x_2) \ldots P_{\rho,b,\sigma^2}(x_m \mid x_{m-1}) =$$
$$P(x_1) \left( \frac{e^{-\frac{(x_1 - \rho x_0 + b)^2}{\sigma^2}}}{\sqrt{2\pi\sigma^2}} \right) \ldots \left( \frac{e^{-\frac{(x_m - \rho x_{m-1} + b)^2}{\sigma^2}}}{\sqrt{2\pi\sigma^2}} \right)$$

where $X_0=x_0$, $X_1=x_1$, ..., $X_m=x_m$; the at least one computing system calculating a $1-\varepsilon$ confidence interval around a mean $\varepsilon[X_{n+1} \mid X_n=x_n]=\rho x_n+b$ and variance $\sigma^2$; and upon the at least one computing system determining that a next measurement $X_{n+1}=x_{n+1}$ is not in the calculated interval: the computing system concluding that a leak likely exists in the associated pipe; and the computing system transmitting instructions to the associated at least one controller to cause the associated at least one control valve to shut off the flow of fluid to the associated pipe.

14. The fluid conservation system according to embodiment 13, wherein the at least one fluid sensor is at least one of a fluid flow sensor and a fluid pressure sensor.

15. The fluid conservation system according to embodiments 13-14, wherein the at least one fluid sensor is positioned in-line with the pipe so as to be in fluid communication with the pipe.

16. The fluid conservation system according to embodiments 13-15, wherein the at least one fluid sensor is positioned on an exterior surface of the pipe.

17. The fluid conservation system according to embodiments 13-16, further comprising an at least one supplemental sensor positioned and configured for gathering additional data related to the pipe system.

18. The fluid conservation system according to embodiments 13-17, wherein the at least one supplemental sensor is at least one of a fluid level sensor, a luminosity sensor, a humidity sensor, an air temperature sensor, a fluid temperature sensor, a rain sensor, and a soil moisture sensor.

19. The fluid conservation system according to embodiments 13-18, wherein the at least one supplemental sensor is at least one of an electrical current sensor and a voltage sensor positioned and configured for monitoring the electrical usage of an at least one fluid pump of the pipe system.

20. The fluid conservation system according to embodiments 13-19, wherein upon the computing system transmitting instructions to the associated at least one controller to shut off the flow of fluid to the associated pipe, the computing system is further configured for shutting off the associated at least one fluid pump.

21. The fluid conservation system according to embodiments 13-20, wherein the at least one supplemental sensor is a meter reading device positioned and configured for capturing images of a display of an existing meter and converting the captured display images into numerical data for subsequent processing by the fluid conservation system.

22. The fluid conservation system according to embodiments 13-21, wherein the at least one supplemental sensor is a chemical analysis sensor capable of analyzing the fluid within the at least one pipe for characteristics such as salinity, suspended solids, and dissolved mineral content.

23. The fluid conservation system according to embodiments 13-22, wherein the chemical analysis sensor comprises a fluid temperature sensor, a conductivity sensor, and a turbidity sensor.

24. The fluid conservation system according to embodiments 13-23, further comprising an at least one power supply in electrical communication with at least one of the at least one fluid sensor, control valve, and controller.

25. The fluid conservation system according to embodiments 13-24, further comprising an at least one database in communication with the computing system and configured for selectively storing said data related to at least one of the at least one fluid sensor, controller and control valve.

26. The fluid conservation system according to embodiments 13-25, further comprising a user application residing in memory on an at least one user device in communication with the at least one computing system, the at least one user device under the control of an at least one user.

27. The fluid conservation system according to embodiments 13-26, wherein upon the at least one computing system determining that a next measurement $X_{n+1}=x_{n+1}$ is not in the calculated interval, the computing system is further configured for transmitting an alert notification to the associated user application.

28. The fluid conservation system according to embodiments 13-27, wherein upon the at least one computing system determining that a next measurement $X_{n+1}=x_{n+1}$ is not in the calculated interval, the computing system is further configured for transmitting at least one of an audible leak indicator and a visual leak indicator to be produced by the associated at least one controller.

29. A non-transitory computer readable medium containing program instructions for causing an at least one computing device to perform a method of dynamically and automatically optimizing fluid usage and preventing waste in an at least one pipe system, the method comprising the steps of: storing an at least one usage profile for the at least one pipe system, each said usage profile containing at least one of a unique zone identifier, a zone location, a zone elevation, a crop type, a soil type, a watering schedule, an average gallons per watering cycle, an average fluid flow rate, and an average fluid pressure rate; establishing an at least one baseline for the at least one usage profile; periodically obtaining from an at least one fluid sensor at least one of a fluid pressure measurement and a fluid flow rate within a pipe of an at least one zone of the pipe system; modeling at least one of the fluid pressure and fluid flow rate within the associated pipe as a time series driven by the following discrete time Markov chain:

$$X_{n+1}=\rho X_n+b+\varepsilon_n$$

where $X_n$ represents the value of fluid pressure or fluid flow rate at time n, $\rho$ represents a correlation coefficient, b represents a scaled baseline expected pressure or flow rate value, and $\varepsilon_n$ represents the measurement noise at time n; calculating the parameters $\rho$, b, and variance $\sigma^2$ using the following formula:

$$P_{\rho,b,\sigma^2}(x_m, x_{m-1}, \ldots, x_2, x_1) = $$
$$P(x_1)P_{\rho,b,\sigma^2}(x_2 \mid x_1)P_{\rho,b,\sigma^2}(x_3 \mid x_2) \ldots P_{\rho,b,\sigma^2}(x_m \mid x_{m-1}) = $$
$$P(x_1)\left(\frac{e^{-\frac{(x_1-\rho x_0+b)^2}{\sigma^2}}}{\sqrt{2\pi\sigma^2}}\right) \ldots \left(\frac{e^{-\frac{(x_m-\rho x_{m-1}+b)^2}{\sigma^2}}}{\sqrt{2\pi\sigma^2}}\right)$$

where $X_0=x_0, X_1=x_1, \ldots, X_m=x_m$; calculating a 1-$\varepsilon$ confidence interval around a mean $\varepsilon[X_{n+1}|X_n=x_n]=\rho x_n+b$ and variance $\sigma^2$; and upon determining that a next measurement $X_{n+1}=x_{n+1}$ is not in the calculated interval: concluding that a leak likely exists in the associated pipe; and transmitting instructions to an associated at least one controller to cause the associated at least one control valve to shut off the flow of fluid to the associated pipe.

30. The method according to embodiment 29, wherein the step of determining that a next measurement $X_{n+1}=x_{n+1}$ is not in the calculated interval, further comprises the step of transmitting an alert notification to a user application residing in memory on an at least one user device in communication with the computing device, the at least one user device under the control of an at least one user.

31. The method according to embodiments 29-30, wherein the step of determining that a next measurement $X_{n+1}=x_{n+1}$ is not in the calculated interval, further comprises the step of transmitting at least one of an audible leak indicator and a visual leak indicator to be produced by the associated at least one controller.

In closing, regarding the exemplary embodiments of the present invention as shown and described herein, it will be appreciated that a fluid conservation system and associated methods are disclosed and configured for dynamically and automatically optimizing fluid usage and preventing waste in an pipe system. Because the principles of the invention may be practiced in a number of configurations beyond those shown and described, it is to be understood that the invention is not in any way limited by the exemplary embodiments, but is generally directed to a fluid conservation system and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment. Additionally, the various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The phrase "non-transitory," in addition to having its ordinary meaning, as used in this document means "enduring or long-lived". The phrase "non-transitory computer readable medium," in addition to having its ordinary meaning, includes any and all computer readable mediums, with the sole exception of a transitory, propagating signal. This includes, by way of example and not limitation, non-transitory computer-readable mediums such as register memory, processor cache and random-access memory ("RAM").

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method for dynamically and automatically optimizing fluid usage and preventing waste in an at least one pipe system, the method comprising the steps of:

positioning an at least one fluid sensor for monitoring at least one of a fluid pressure and a fluid flow rate within a pipe of an at least one zone of the pipe system;

positioning an at least one control valve in-line with the pipe of at least one zone of the pipe system, the at least one control valve configured for being selectively actuated for controlling a flow of fluid through the associated pipe;

positioning an at least one controller for being in communication with each of the at least one fluid sensor and at least one control valve so as to receive data collected by the at least one fluid sensor and selectively actuate the at least one control valve;

implementing an at least one central computing system in selective communication with the at least one controller and configured for receiving and processing data related to at least one of the at least one fluid sensor, controller and control valve;

the at least one computing system storing an at least one usage profile for the at least one pipe system, each said usage profile containing at least one of a unique zone identifier, a zone location, a zone elevation, a crop type, a soil type, a watering schedule, an average gallons per watering cycle, an average fluid flow rate, and an average fluid pressure rate;

the at least one computing system establishing an at least one baseline for the at least one usage profile;

the at least one fluid sensor periodically measuring at least one of the fluid pressure and fluid flow rate within the associated pipe and transmitting said measurements to the at least one controller;

the at least one controller transmitting said measurements to the at least one computing system;

the at least one computing system modeling at least one of the fluid pressure and fluid flow rate within the associated pipe as a time series driven by the following discrete time Markov chain:

$$X_{n+1} = \rho X_n + b + \varepsilon_n$$

where $X_n$ represents the value of fluid pressure or fluid flow rate at time n, $\rho$ represents a correlation coefficient, b represents a scaled baseline expected pressure or flow rate value, and $\varepsilon_n$ represents the measurement noise at time n;

the at least one computing system calculating the parameters $\rho$, b, and variance $\sigma^2$ using the following formula:

$$P_{\rho,b,\sigma^2}(x_m, x_{m-1}, \ldots, x_2, x_1) =$$

$$P(x_1)P_{\rho,b,\sigma^2}(x_2 \mid x_1)P_{\rho,b,\sigma^2}(x_3 \mid x_2) \ldots P_{\rho,b,\sigma^2}(x_m \mid x_{m-1}) =$$

$$P(x_1)\left(\frac{e^{-\frac{(x_1-\rho x_0+b)^2}{\sigma^2}}}{\sqrt{2\pi\sigma^2}}\right) \ldots \left(\frac{e^{-\frac{(X_m-\rho X_{m-1}+b)^2}{\sigma^2}}}{\sqrt{2\pi\sigma^2}}\right)$$

where $X_0=x_0, X_1=x_1, \ldots, X_m=x_m$;

the at least one computing system calculating a $1-\varepsilon$ confidence interval around a mean $\varepsilon[X_{n+1}|X_n=x_n]=\rho x_n+b$ and variance $\sigma^2$; and upon the at least one computing system determining that a next measurement $X_{n+1}=x_{n+1}$ is not in the calculated interval:
  the computing system concluding that a leak likely exists in the associated pipe; and
  the computing system transmitting instructions to the associated at least one controller to cause the associated at least one control valve to shut off the flow of fluid to the associated pipe.

2. The method of claim 1, wherein the step of positioning the at least one fluid sensor further comprises the step of positioning the at least one fluid sensor in-line with the pipe so as to be in fluid communication with the pipe.

3. The method of claim 1, wherein the step of positioning the at least one fluid sensor further comprises the step of positioning the at least one fluid sensor on an exterior surface of the pipe.

4. The method of claim 1, further comprising the step of implementing a user application residing in memory on an at least one user device in communication with the at least one computing system, the at least one user device under the control of an at least one user.

5. The method of claim 1, wherein the step of the at least one computing system determining that a next measurement $X_{n+1}=x_{n+1}$ is not in the calculated interval, further comprises the step of the computing system transmitting at least one of an audible leak indicator and a visual leak indicator to be produced by the associated at least one controller.

6. A fluid conservation system configured for dynamically and automatically optimizing fluid usage and preventing waste in an at least one pipe system, the system comprising:
  an at least one fluid sensor positioned and configured for monitoring a flow of fluid through a pipe of an at least one zone of the pipe system;
  an at least one control valve positioned in-line with the pipe of at least one zone of the pipe system, the at least one control valve configured for being selectively actuated for controlling the flow of fluid through the associated pipe;
  an at least one controller positioned and configured for being in communication with each of the at least one fluid sensor and at least one control valve so as to receive data collected by the at least one fluid sensor and selectively actuate the at least one control valve;
  an at least one central computing system in selective communication with the at least one controller and configured for receiving and processing data related to at least one of the at least one fluid sensor, controller and control valve;
  wherein, the system is configured for carrying out the steps of:
    the at least one computing system storing an at least one usage profile for the at least one pipe system, each said usage profile containing at least one of a unique zone identifier, a zone location, a zone elevation, a crop type, a soil type, a watering schedule, an average gallons per watering cycle, an average fluid flow rate, and an average fluid pressure rate;
    the at least one computing system establishing an at least one baseline for the at least one usage profile;
    the at least one fluid sensor periodically measuring at least one of the fluid pressure and fluid flow rate within the associated pipe and transmitting said measurements to the at least one controller;
    the at least one controller transmitting said measurements to the at least one computing system;
    the at least one computing system modeling at least one of the fluid pressure and fluid flow rate within the associated pipe as a time series driven by the following discrete time Markov chain:

$$X_{n+1}=\rho X_n+b+\varepsilon_n$$

where $X_n$ represents the value of fluid pressure or fluid flow rate at time n, $\rho$ represents a correlation coefficient, b represents a scaled baseline expected pressure or flow rate value, and $\varepsilon_n$ represents the measurement noise at time n;
    the at least one computing system calculating the parameters $\rho$, b, and variance $\sigma^2$ using the following formula:

$$P_{\rho,b,\sigma^2}(x_m, x_{m-1}, \ldots, x_2, x_1) =$$

$$P(x_1)P_{\rho,b,\sigma^2}(x_2 \mid x_1)P_{\rho,b,\sigma^2}(x_3 \mid x_2) \ldots P_{\rho,b,\sigma^2}(x_m \mid x_{m-1}) =$$

$$P(x_1)\left(\frac{e^{-\frac{(x_1-\rho x_0+b)^2}{\sigma^2}}}{\sqrt{2\pi\sigma^2}}\right) \ldots \left(\frac{e^{-\frac{(X_m-\rho X_{m-1}+b)^2}{\sigma^2}}}{\sqrt{2\pi\sigma^2}}\right)$$

where $X_0=x_0, X_1=x_1, \ldots, X_m=x_m$;
    the at least one computing system calculating a $1-\varepsilon$ confidence interval around a mean $\varepsilon[X_{n+1}|X_n=x_n]=\rho x_n+b$ and variance $\sigma^2$; and
    upon the at least one computing system determining that a next measurement $X_{n+1}=x_{n+1}$ is not in the calculated interval:
      the computing system concluding that a leak likely exists in the associated pipe; and
      the computing system transmitting instructions to the associated at least one controller to cause the associated at least one control valve to shut off the flow of fluid to the associated pipe.

7. The fluid conservation system of claim 6, wherein the at least one fluid sensor is at least one of a fluid flow sensor and a fluid pressure sensor.

8. The fluid conservation system of claim 6, wherein the at least one fluid sensor is positioned in-line with the pipe so as to be in fluid communication with the pipe.

9. The fluid conservation system of claim 6, wherein the at least one fluid sensor is positioned on an exterior surface of the pipe.

10. The fluid conservation system of claim 6, further comprising an at least one supplemental sensor positioned and configured for gathering additional data related to the pipe system.

11. The fluid conservation system of claim 10, wherein the at least one supplemental sensor is at least one of a fluid level sensor, a luminosity sensor, a humidity sensor, an air temperature sensor, a fluid temperature sensor, a rain sensor, and a soil moisture sensor.

12. The fluid conservation system of claim 10, wherein the at least one supplemental sensor is at least one of an electrical current sensor and a voltage sensor positioned and configured for monitoring the electrical usage of an at least one fluid pump of the pipe system.

13. The fluid conservation system of claim 12, wherein upon the computing system transmitting instructions to the associated at least one controller to shut off the flow of fluid to the associated pipe, the computing system is further configured for shutting off the associated at least one fluid pump.

14. The fluid conservation system of claim 10, wherein the at least one supplemental sensor is a meter reading device positioned and configured for capturing images of a display of an existing meter and converting the captured display images into numerical data for subsequent processing by the fluid conservation system.

15. The fluid conservation system of claim 10, wherein the at least one supplemental sensor is a chemical analysis sensor capable of analyzing the fluid within the at least one pipe for characteristics such as salinity, suspended solids, and dissolved mineral content.

16. The fluid conservation system of claim 15, wherein the chemical analysis sensor comprises a fluid temperature sensor, a conductivity sensor, and a turbidity sensor.

17. The fluid conservation system of claim 6, further comprising a user application residing in memory on an at least one user device in communication with the at least one computing system, the at least one user device under the control of an at least one user.

18. The fluid conservation system of claim 6, wherein upon the at least one computing system determining that a next measurement $X_{n+1} = x_{n+1}$ is not in the calculated interval, the computing system is further configured for transmitting at least one of an audible leak indicator and a visual leak indicator to be produced by the associated at least one controller.

19. A non-transitory computer readable medium containing program instructions for causing an at least one computing device to perform a method of dynamically and automatically optimizing fluid usage and preventing waste in an at least one pipe system, the method comprising the steps of:

storing an at least one usage profile for the at least one pipe system, each said usage profile containing at least one of a unique zone identifier, a zone location, a zone elevation, a crop type, a soil type, a watering schedule, an average gallons per watering cycle, an average fluid flow rate, and an average fluid pressure rate;

establishing an at least one baseline for the at least one usage profile;

periodically obtaining from an at least one fluid sensor at least one of a fluid pressure measurement and a fluid flow rate within a pipe of an at least one zone of the pipe system;

modeling at least one of the fluid pressure and fluid flow rate within the associated pipe as a time series driven by the following discrete time Markov chain:

$$X_{n+1} = \rho X_n + b + \varepsilon_n$$

where $X_n$ represents the value of fluid pressure or fluid flow rate at time n, $\rho$ represents a correlation coefficient, b represents a scaled baseline expected pressure or flow rate value, and $\varepsilon_n$ represents the measurement noise at time n;

calculating the parameters $\rho$, b, and variance $\sigma^2$ using the following formula:

$$P_{\rho,b,\sigma^2}(x_m, x_{m-1}, \ldots, x_2, x_1) =$$
$$P(x_1) P_{\rho,b,\sigma^2}(x_2 \mid x_1) P_{\rho,b,\sigma^2}(x_3 \mid x_2) \ldots P_{\rho,b,\sigma^2}(x_m \mid x_{m-1}) =$$
$$P(x_1) \left( \frac{e^{-\frac{(x_1 - \rho x_0 + b)^2}{\sigma^2}}}{\sqrt{2\pi\sigma^2}} \right) \ldots \left( \frac{e^{-\frac{(x_m - \rho x_{m-1} + b)^2}{\sigma^2}}}{\sqrt{2\pi\sigma^2}} \right)$$

where $X_0 = x_0, X_1 = x_1, \ldots, X_m = x_m$;

calculating a $1-\varepsilon$ confidence interval around a mean $\varepsilon[X_{n+1} \mid X_n = x_n] = \rho x_n + b$ and variance $\sigma^2$; and upon determining that a next measurement $X_{n+1} = x_{n+1}$ is not in the calculated interval: concluding that a leak likely exists in the associated pipe; and transmitting instructions to an associated at least one controller to cause the associated at least one control valve to shut off the flow of fluid to the associated pipe.

20. The method of claim 19, wherein the step of determining that a next measurement $X_{n+1} = x_{n+1}$ is not in the calculated interval, further comprises the step of transmitting at least one of an audible leak indicator and a visual leak indicator to be produced by the associated at least one controller.

* * * * *